NONDESTRUCTIVE READ MEMORY

Filed May 22, 1964

INVENTOR.
ROBERT F. ELFANT
BY Thomas & Crickenberger
ATTORNEYS

United States Patent Office 3,490,009

Patented Jan. 13, 1970

3,490,009

NONDESTRUCTIVE READ MEMORY

Robert F. Elfant, Yorktown Heights, N.Y., assignor to International Business Machines Corporation, New York, N.Y., a corporation of New York Filed May 22, 1964, Ser. No. 369,499
Int. Cl. G11b *5/00*
U.S. Cl. 340—174 6 Claims

ABSTRACT OF THE DISCLOSURE

A memory device including a storage element constructed of magnetizable material which is isotropic in the bulk, the storage element comprising a cylindrical hollow body which acquires a type of shape anistropy, the storage element being magnetized longitudinally to represent binary information, and a wire extending through the cylindrical hollow body being supplied with current in either direction to perform non-destructive reading of the stored binary information.

BACKGROUND OF THE INVENTION

This invention relates to magnetic storage elements and more particularly to a magnetic storage element in the form of an elongated body such as a cylinder.

Earlier magnetic storage devices include magnetic tapes or magnetic drums with small elemental spots or areas magnetized in a north or south direction to represent binary information or magnetic cores having remanent flux in the clockwise or counterclockwise direction to represent binary information. Such magnetic storage elements include circuits for establishing magnetic fields in the easy direction of magnetization to represent binary information. This invention, on the other hand, utilizes a magnetic storage element in which the remanent magnetization is established in the hard direction in the elongated body to represent binary information.

SUMMARY OF THE INVENTION

There is provided according to this invention an improved magnetic storage element in the form of an elongated body made of magnetic material exhibiting remanence. Due to the shape of the body, the axis parallel to the longitudinal axis of the body is a magnetic hard direction. Information is stored by saturating the body longitudinally in either of two directions to represent binary information. Information is interrogated or read non-destructively by applying a field circumferential with respect to the longitudinal axis of the elongated body. Since the easy direction of magnetization for the structure is about or around the body and the hard axis is as defined hereinabove, it normally would be expected that the application of a circumferential field would establish remanent magnetization about or around the body and that further applications of a circumferential field would produce little or no flux change. This, however, is not the case. On the contrary, each time a circumferential field is applied, the element is interrogated or read by a change in magnetic flux in the body which is sufficient to provide a large output signal indicative of the binary information stored therein. Furthermore, the element may be repetitively interrogated or read without destroying the remanent magnetization in the hard direction.

There is provided according to this invention a ferromagnetic or ferrimagnetic storage element including an elongated body which can be read out non-destructively. Information is stored in the magnetic body by saturating it in the hard direction of magnetization in the one or zero remanence state by, e.g., bringing either the north or south pole of a permanent magnet or electromagnet to the vicinity of the body. In one embodiment, a first wire is passed through a hollow body or tube and is termed the read winding. A second wire is wrapped around the tube and is termed the sense winding. A current pulse on the read line causes a pair of pulses of opposite polarity to be established on the sense line, the relative polarity of the pulses signifying whether a one or zero is stored in the memory tube. The polarity of the output signal on the sense winding is independent of the direction of the current in the read winding. After the information is stored by the permanent magnet or electromagnet in the memory tube, the presence of such magnet is no longer required. Although the precise manner in which the device operates is not known, it makes use of a kind of shape anisotropy in materials which are isotropic in the bulk.

It is theoretically expected and experimentally verified that the amount of flux remaining in the longitudinal direction after the writing and reading operations should be a function of the material properties such as the saturation flux density $B_s$ and the coercive force $H_c$ and also should be a function of the geometrical properties; that is, length L, the inner diameter ID, and the outer diameter OD. In fact it is theoretically expected that the percentage of the total flux remaining in the longitudinal direction should increase as the saturation longitudinal demagnetizing field $H_{D_S}$ decreases. For small saturation longitudinal demagnetizing fields $H_{D_S}$, the percentage of the total flux remaining in the longitudinal direction will be determined in a complicated way by the amplitude of the read pulse and the coercive force $H_c$. As the saturation longitudinal demagnetizing field $H_{D_S}$ is increased, the remaining longitudinal flux will start to decrease, and experimentally it is found that when the demagnetizing field becomes 100 $H_c$, the flux remaining in the longitudinal direction has been reduced by a factor of five from that case in which the saturation longitudinal demagnetizing field $H_{D_S}$ was much less than 100 $H_c$. The saturation longitudinal demagnetizing field is defined by the following equation:

$$H_{D_S}=\frac{N'}{4\pi}B_s$$

where N′ is a demagnetizing factor and $B_s$ is the saturation flux density in gauss. The demagnetization factor N′ may be defined by the following equation:

$$(OD/L)^2\,[1-(ID/OD)^2]\,[\ln 2L/OD-1]=N'/4\pi$$

where:

OD=outside diameter
ID=inside diameter
L=length.

For a cylindrical geometry the values of N′ can be determined from various sources of well known literature. For example, reference may be made to an article entitled "Magnetic Fields of Twistors Represented by Confocal, Hollow, Prolate Spheroids" by H. Chang and A. G. Milnes, published in the IRS Transactions on Electronic Computers, vol. EC–9, No. 2, June 1960, pages 199 through 207. Note that in FIG. 7 of this article the demagnetizing factor N is plotted as a function of a dimensional ratio $a_e/b_e$, where $a_e=L/2$ and $b_e=OD/2$. It must be pointed out that the notation used by Chang and Milnes differs from that used here in that their $N=N'/4$, $a_e=L/2$, $b_e=OD/2$ and $b_i=ID/2$.

It is a feature of this invention to provide an improved magnetic storage element.

It is another feature of this invention to provide a magnetic storage element which may be non-destructively read.

It is a further feature of this invention to provide a magnetic storage element wherein information is represented by a magnetic field in the hard direction of magnetization.

It is a still further feature of this invention to provide a magnetic storage element in form of a cylinder in which remanent magnetic flux is established in either direction longitudinally to represent binary information.

It is a further feature of this invention to provide a magnetic storage element in a form of a cylinder having a wire passing through the cylinder which is energized to interrogate or read information and a wire disposed around the outer surface of the cylinder to provide a signal indicative of the information stored therein.

It is a feature of this invention to provide a magnetic cylinder as a storage element in an array for storing binary information.

The foregoing and other objects, features and advantages of the invention will be apparent from the following more particular description of a preferred embodiment of the invention, as illustrated in the accompanying drawings.

DESCRIPTION OF THE PREFERRED EMBODIMENT

Figure 1:
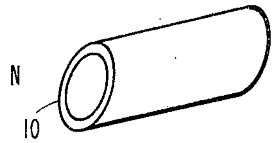
FIG. 1 shows a cylinder according to this invention.

Referring to FIG. 1, a magnetizable elongated hollow body of magnetic material which may take various shapes is illustrated and described herein as a cylinder 10. It is made of a ferromagnetic or ferrimagnetic material. The magnetizable cylinder 10 is magnetized longitudinally in the hard direction of magnetization by bringing a permanent magnet or electromagnet near the cylinder 10. The cylinder 10 is magnetized with magnetic lines of flux forming a north pole on the left end and a south pole on the right end to represent one binary quantity, and the cylinder 10 is magnetized in the reverse direction with a south pole on the left end and a north pole on the right end to represent the other binary quantity. The cylinder 10 may be magnetized longitudinally by placing a magnet or electromagnet near the cylinder. Once the cylinder 10 has been magnetized in one direction or the other to represent a selected binary quantity, the permanent magnet or electromagnet may be removed, and a remanent magnetization is established longitudinally in the hard direction.

Figure 2:
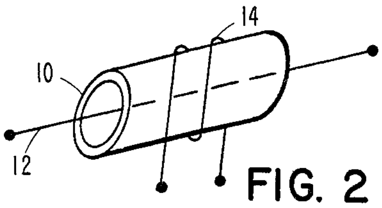
FIG. 2 shows a magnetized cylinder with associated circuits.

As illustrated in FIG. 2 a wire 12, termed a read line, passes through the cylinder 10, and a coil 14 is disposed around the outer periphery of the cylinder 10. The coil 14 serves as a sense winding. If a current is applied to the read line 12, a signal is induced in the sense winding 14 which indicates whether a binary zero or a binary one is stored. Actually, the cylinder 10 may be magnetized to represent a binary one or zero by energizing the sense winding 14 with current of proper amplitude in one direction or the other.

Figure 3:
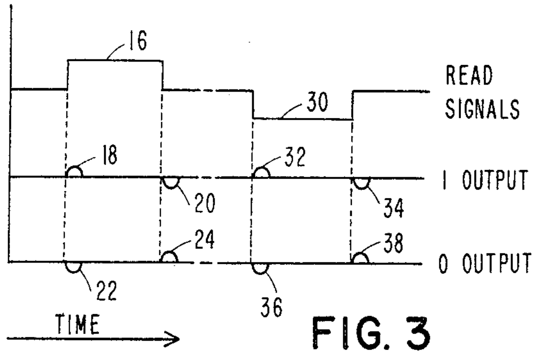
FIG. 3 shows waveforms useful in explaining the operation of the device in FIG. 2.

Referring next to FIG. 3, read pulses and corresponding output signals are illustrated for remanent magnetizations in a cylinder representing binary one and binary zero. When a read pulse 16 in FIG. 3 is applied to the read line 12 in FIG. 2 and the cylinder 10 is magnetized longitudinally in one direction, a positive signal 18 followed by a negative signal 20 are provided on the sense winding 14 at the respective initiation and termination of the read pulse 16. The magnetized state of the cylinder 10 is arbitrarily designated binary one in this instance. If the longitudinal magnetization of the cylinder 10 in FIG. 2 is reversed and a read pulse 16 in FIG. 3 is applied to the read line 12 in FIG. 2, a negative signal 22 followed by a positive signal 24 are provided on the sense winding 14 at the respective initiation and termination of the read pulse 16. The magnetized state of the cylinder 10 in FIG. 2 is arbitrarily designated binary zero in this instance. It is pointed out that the first time the cylinder 10 is read after writing a binary one or a binary zero, the output signal is much larger than subsequent readings, and for this reason it may be desirable to apply a first read pulse and disregard the output signals upon initial installation.

The cylinder 10 in FIG. 2 may be read repetitively by pulses applied to the read line 12 without destroying the remanent magnetization in the cylinder 10. As long as the cylinder 10 in FIG. 2 remains magnetized in the one state, a positive pulse 18 followed by a negative pulse 20 is provided on the sense winding 14 each time a read pulse is applied to the read line 12. As long as the cylinder 10 in FIG. 2 remains magnetized in the zero state, a negative pulse 22 followed by a positive pulse 24 is provided on the sense winding 14 each time a read pulse is applied to read line 12. It is pointed out that the output signals are a function of the remanent state of magnetization of the cylinder 10, and the polarity of the output signals is not altered by the direction of the read signals applied to the read line 12. Note in this connection that a negative read pulse 30 in FIG. 3 provides a positive output signal 32 followed by a negative output signal 34 whenever the cylinder 10 in FIG. 2 is magnetized in the one state, and a negative output signal 36 followed by a positive output signal 38 are provided if the cylinder 10 is in the zero state of magnetization. If the output signals provided by the positive read pulse 16 in FIG. 3 are compared with the output signals provided by the negative read pulse 30 in FIG. 3, it is observed that the output signals are a function of the remanent state of magnetization, not the polarity or direction of read pulses. For example, when the cylinder 10 is in the one state of magnetization, a positive output signal 18 followed by a negative output signal 20 are provided if a positive read pulse 16 is employed, and a positive signal 32 followed by a negative signal 34 are provided if a negative read pulse 30 is employed. Likewise, when the cylinder 10 is magnetized in the zero state, a negative output signal 22 followed by a positive output signal 24 are provided where a positive read pulse 16 is employed, and a negative output signal 36 is followed by a positive output signal 38 are provided when a negative read pulse 30 is employed. Accordingly, it is seen that the output signals remain the same regardless of the polarity of the read signal applied to the read line 12 in FIG. 2.

According to this invention a set of ferrite cylinders having an inside diameter ID of 11 mils, an outer diameter OD of 20 mils and varying lengths were constructed. The saturation flux density $B_s$ was approximately 2200 gauss, and the coercive force $H_c$ was 1 oersted. The field used to write ones and zeros was a bipolar field of 50 oersteds generated by a coil pair. The read field was approximately 20 oersteds and of 1 microsecond duration. The effects of air coupling were eliminated. The peak amplitude of the bipolar output signals $e_0$ for the ferrite cylinders of various lengths L are tabulated in Table 1 below:

Table 1

| | |
|---|---|
| $e_0$=1 mil volt at 50 nanosec. | $L$=75 mils |
| $e_0$=2.5 mil volt at 50 nanosec. | $L$=97 mils |
| $e_0$=3 mil volt at 50 nanosec. | $L$=140 mils |
| $e_0$=4.5 mil volt at 50 nanosec. | $L$=200 mils |
| $e_0$=5 mil volt at 50 nanosec. | $L$=300 mils |

Figure 4:
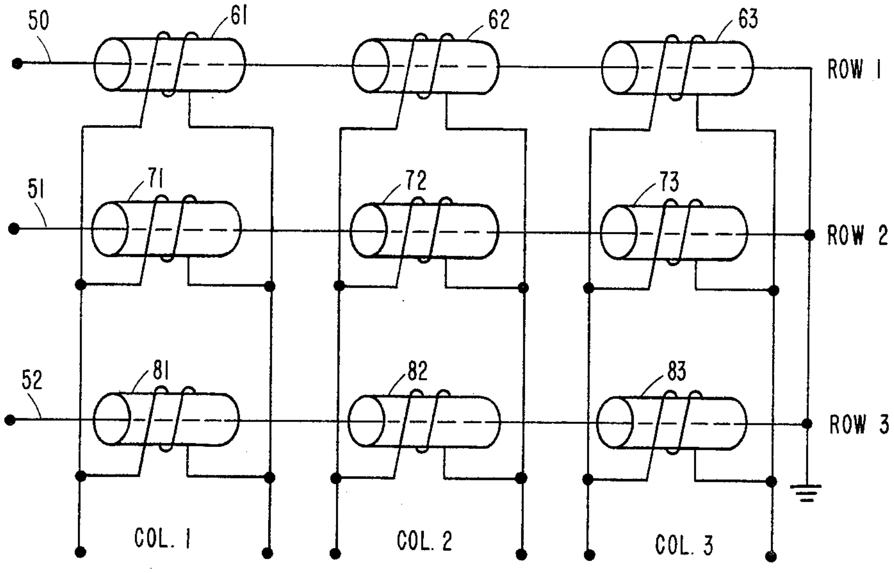
FIG. 4 shows how storage elements according to this invention may be employed in a matrix arrangement.

A cylindrical magnetic storage element such as illustrated in FIG. 2 may be incorporated in a non-destructive memory matrix such as illustrated in FIG. 4. Binary words may be stored in the rows of the matrix. By applying read pulses to respective lines 50 through 52, words stored in respective rows 1 through 3 may be read non-destructively. If a read pulse is applied to the read line 50, information represented by longitudinal remanent magnetization of the cylinders 61 through 63 may be read from the respective columns 1 through 3. If a read pulse is applied to the read line 51, information stored in the cylinders 71 through 73 of row 2 may be read from respective columns 1 through 3. In like fashion, information stored in the cylinders 81 through 83 in row 3 may be read from the respective columns 1 through 3 by applying a read pulse on the read line 52.

While the invention has been particularly shown and described with reference to a preferred embodiment thereof, it will be understood by those skilled in the art that various changes in form and details may be made therein without departing from the spirit and scope of the invention.

What is claimed is:

1. A non-destructive read memory element comprising:

an elongated hollow body of magnetic material having remanent magnetization in a direction parallel to the longitudinal axis thereof to represent binary information, means coupled to said elongated hollow body for non-destructively reading the binary information by applying to said elongated hollow body a magnetic field perpendicular to its longitudinal axis for varying the longitudinal magnetization in said body, the perpendicular magnetic field being polarized in either of its two possible directions, and sense means coupled to said elongated hollow body for providing an output signal representative of stored binary information in response to the variations of the longitudinal magnetization of said elongated hollow body, said output signal being a function of the direction of the longitudinal magnetic field and being independent of the direction of the perpendicular magnetic field.

2. A non-destructive read storage element constructed of magnetic material, said storage element comprising an elongated hollow body with remanent magnetization disposed longitudinally in either direction to represent binary information.

a read line extending through said elongated hollow body, a sense winding around the outside of said elongated hollow body, and means for non-destructively reading the binary information stored in said elongated hollow body by applying a current in either direction to said read line which changes the longitudinal magnetization and induces an output signal on the sense winding indicative of the binary information represented by the direction of the remanent magnetization disposed longitudinally of said elongated hollow body, and said output signal being independent of the direction of the current applied to said read line.

3. A non-destructive read storage element constructed of magnetic material which is isotropic in the bulk, said storage element comprising an elongated hollow body made of said isotropic magnetic material, said storage element acquiring a type of shape anisotropy, means to magnetize said elongated hollow body longitudinally in either direction to represent binary information, a read line extending through said body, a sense winding disposed around the outside of said cylinder, and means to read said storage element non-destructively by applying current signals in either direction to the read line and thereby obtain output signals on the sense winding indicative of the binary information represented by the direction of the longitudinal magnetization of said elongated hollow body.

4. A non-destructive read storage element constructed of magnetic material which is isotropic in the bulk, said storage element comprising an elongated hollow body having a remanent magnetic field longitudinally in either direction to represent binary information, said elongated hollow body being made of said isotropic material and thereby acquiring a shape anistropy, a read line extending through said body, a sense winding disposed around the outside of said cylinder, and means to read said storage element non-destructively by applying current signals in either direction to said read line and thereby induce output signals on the sense winding indicative of the binary information represented by the direction of the longitudinal magnetization of said elongated hollow body.

5. A matrix including a plurality of non-destructive read storage elements, each storage element comprising an elongated hollow body made of magnetic material which has a remanent magnetic field disposed longitudinally in either direction to represent binary information, said storage elements being arranged in columns and rows, a read wire for each row which passes through all of said storage elements in a given row, a sense winding disposed around the outside of each of said storage elements, means connecting in parallel all sense windings in each column, and means to read non-destructively the binary information stored in all storage elements of a selected row by applying a current in either direction to the read line of the selected row and thereby inducing output signals on the sense windings of the selected row indicative of the binary information represented by the direction of the longitudinal remanent magnetization of the elongated hollow bodies of the selected row and not by the direction of the current applied to said read line.

6. A matrix including a plurality of non-destructive read storage elements constructed of a magnetic material which is isotropic in the bulk, each storage element comprising a hollow cylinder made of such material, each of said hollow cylinders acquiring a type of shape anisotropy, means to magnetize each of said hollow cylinders longitudinally in either direction selectively to represent binary information, said storage elements being arranged in columns and rows, a read wire for each row which passes through all of said storage elements in a given row, a sense winding disposed around the outside of each of said storage elements, means connecting in parallel all sense windings in each column, and means to apply current signals in either direction to a selected read line and thereby provide output signals on the sense windings of the selected row indicative of the binary information represented by the direction of the longitudinal magnetization of each of said storage elements in the selected row.

References Cited

UNITED STATES PATENTS

| | | | |
|---|---|---|---|
| 3,031,648 | 4/1962 | Haber et al. | 340—174 |
| 3,069,661 | 12/1962 | Gianola | 340—174 |
| 3,223,986 | 12/1965 | Clark | 340—174 |
| 3,278,914 | 10/1966 | Rashleigh et al. | 340—174 |
| 3,071,756 | 1/1963 | Pugh | 340—174 |
| 3,239,754 | 3/1966 | Odom et al. | 340—174 |

OTHER REFERENCES

Haneman, W. J. and Lehmann, J., "Magnetic Set-A-Line Switch Compensation," RCA TN No. 325, November 1959, 2 p.

TERRELL W. FEARS, Primary Examiner

J. F. BREIMAYER, Assistant Examiner